W. L. & J. O. CASADAY.
M. CASADAY, ADMINISTRATRIX OF W. L. CASADAY, DEC'D.
FLUE CLEANER.
APPLICATION FILED JUNE 21, 1909.
1,060,163.
Patented Apr. 29, 1913.
5 SHEETS—SHEET 2.
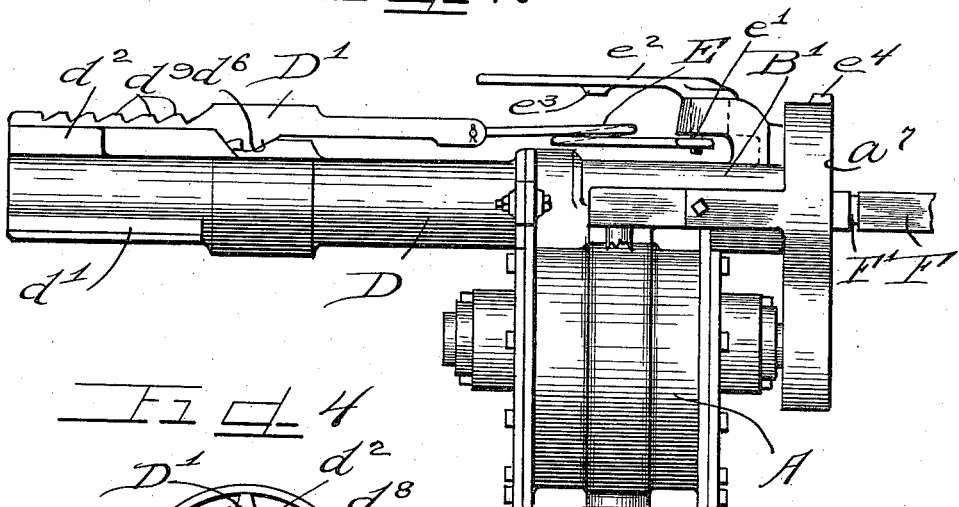
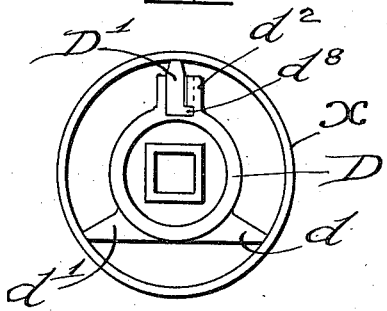
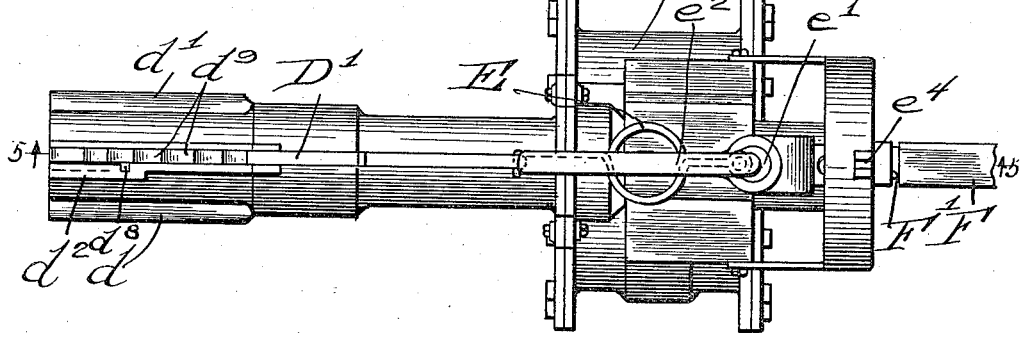

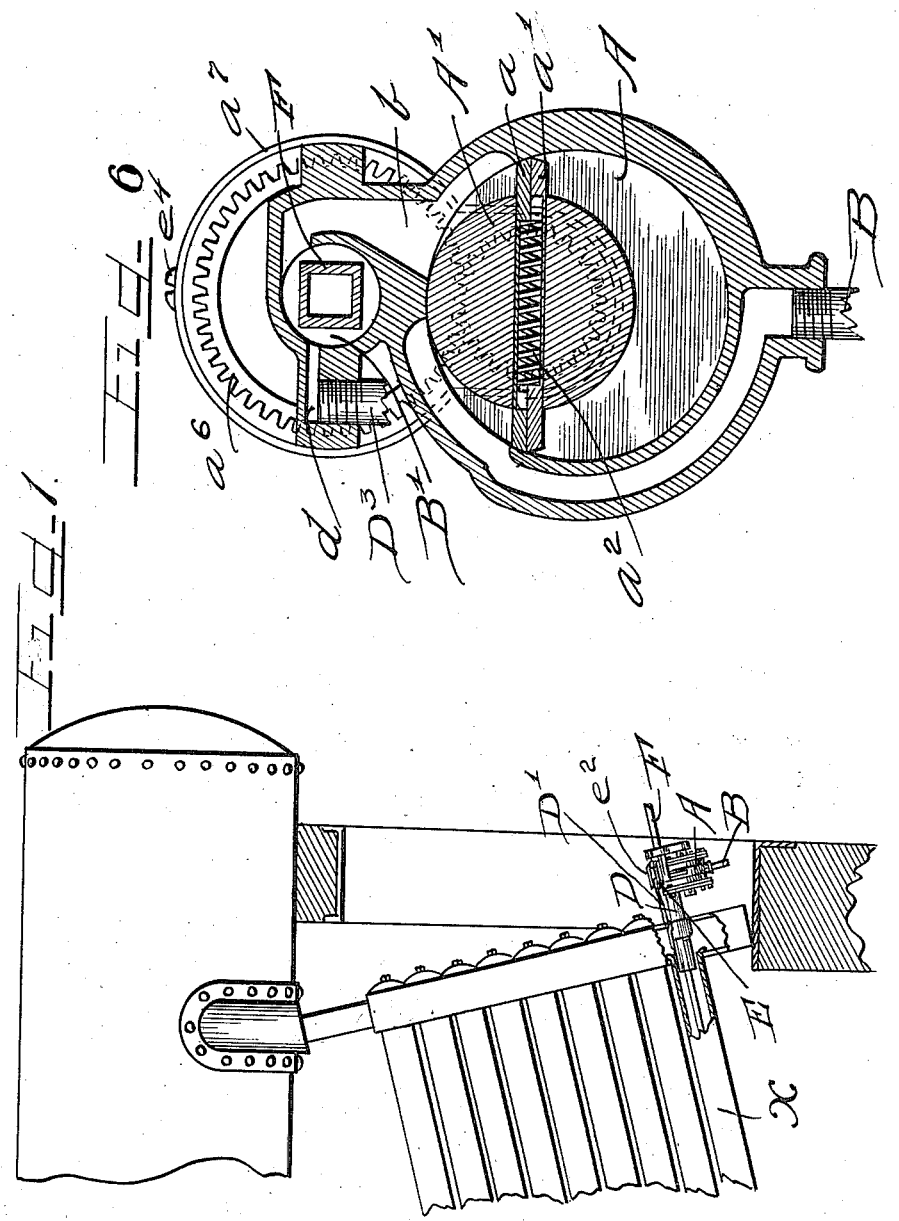

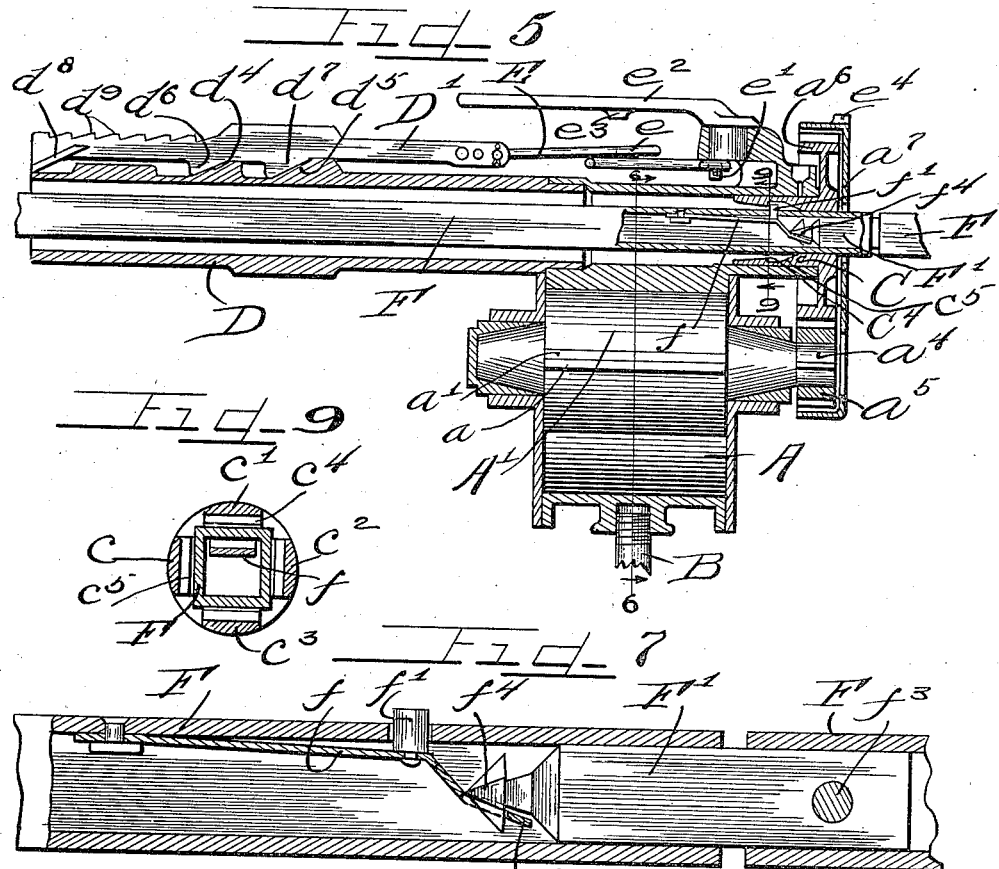

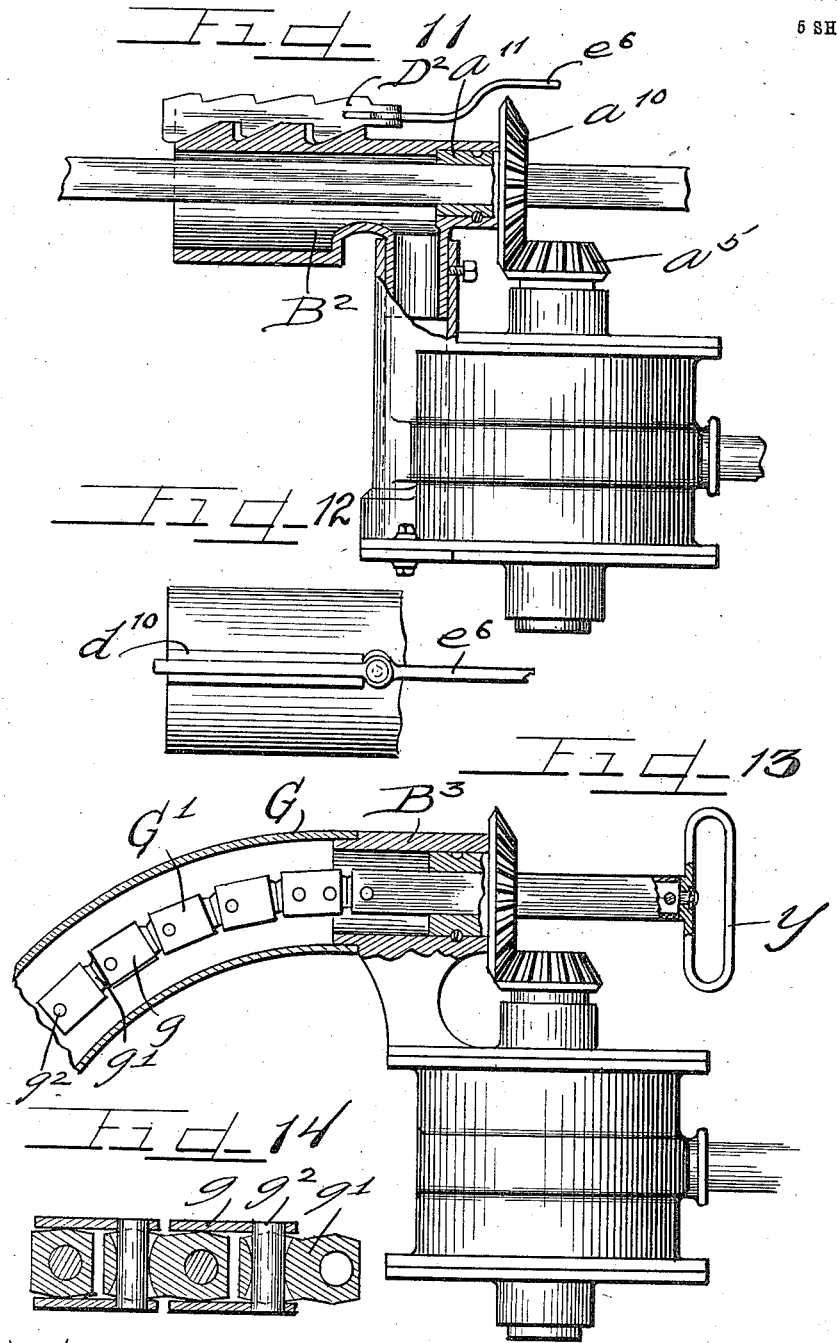

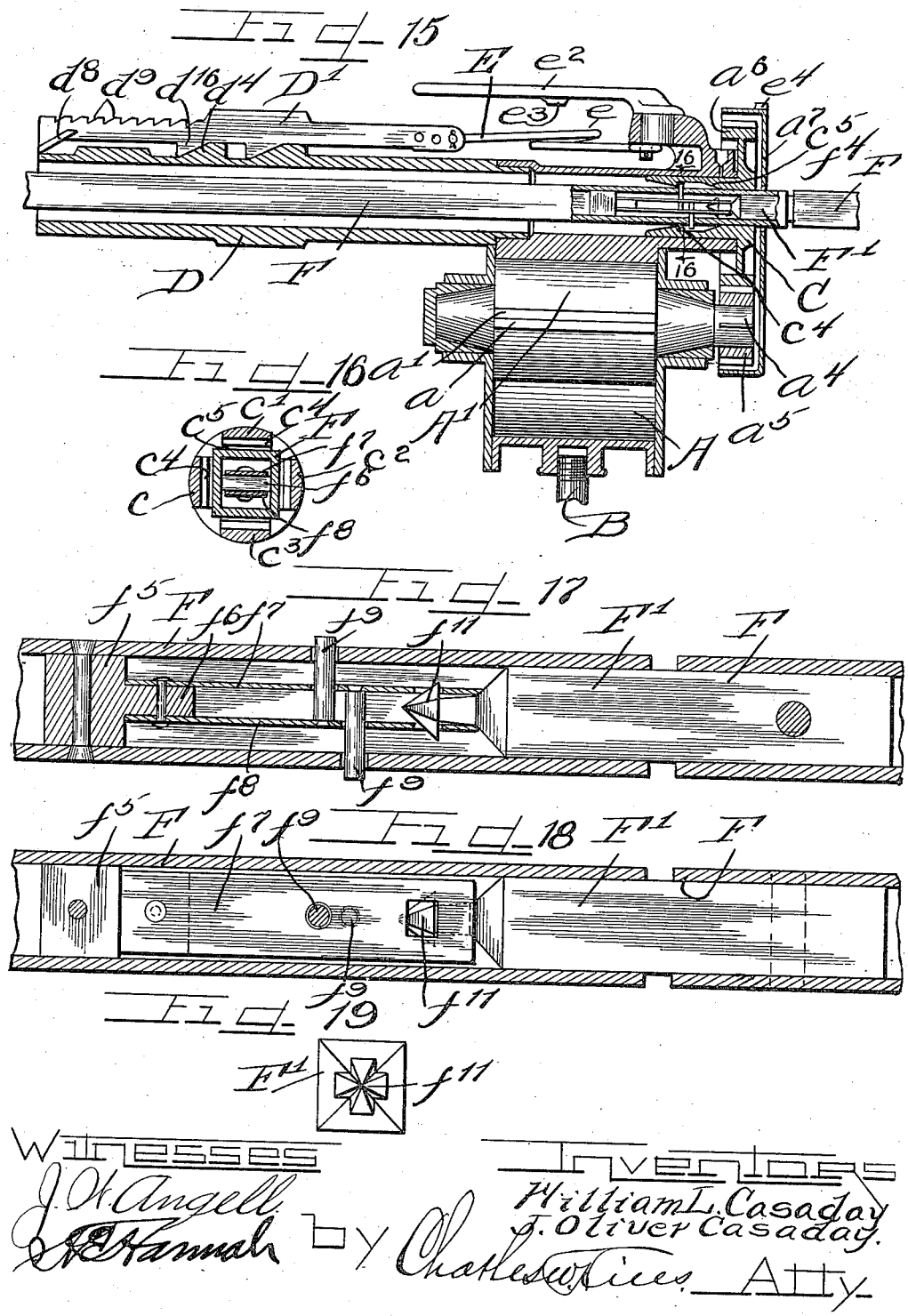

UNITED STATES PATENT OFFICE.

WILLIAM L. CASADAY AND JAMES OLIVER CASADAY, OF SOUTH BEND, INDIANA; MARIA CASADAY, ADMINISTRATRIX OF SAID WILLIAM L. CASADAY, DECEASED, ASSIGNOR TO SAID JAMES OLIVER CASADAY.

FLUE-CLEANER.

1,060,163.  Specification of Letters Patent.  Patented Apr. 29, 1913.

Application filed June 21, 1909. Serial No. 503,321.

*To all whom it may concern:*

Be it known that we, WILLIAM L. CASADAY and JAMES O. CASADAY, citizens of the United States, and residents of the city of South Bend, St. Joseph county, Indiana, have invented certain new and useful Improvements in Flue-Cleaners; and we hereby declare that the following is a full, clear, and exact description of the same, reference being had to the accompanying drawings, and to the letters of reference marked thereon, which form a part of this specification.

In water tube boilers, scale (unless the flues or tubes are frequently cleaned) soon becomes hardened in the tubes and affords an insulating coating through which the heat cannot readily pass.

The object of this invention is to afford a power flue cleaner of the general class set forth in the prior application for patent of William L. Casaday for " supporting and driving means for flue cleaners and the like," filed May 28th, 1908, Serial No. 435,555, and in which the flue cleaner is driven by a small engine or motor supported on the boiler header or otherwise, and which permits ready adjustment to clean the different flues. In the flue cleaner just referred to more than one man is usually necessary to operate the device and a long platform is necessary, and, owing to the construction of the supporting device for the motor and cleaner, considerable time is required in effecting the adjustment.

The object of this invention is to afford a device of the class described adapted to be easily and very quickly adjusted by an operator and which enables the operator to work close to the boiler and without a special platform, and by means of which all the various adjustments and operations are much more quickly, easily and economically performed and with the expenditure of less power than has heretofore been necessary, and in which the change from one tube or flue to another may be effected by one operator in less time than has heretofore been necessary to effect the change by two or more.

The invention also has for its object the construction of a shaft in short sections adapted to be inserted into the machine and to automatically interlock as inserted, and which, when removed from the machine, also automatically unlock, thus enabling very short shaft sections to be used, and furthermore, owing to the small size of the motor, which permits insertion through an ordinary man hole, and owing to the short automatically locking and unlocking shaft sections, permits the use of the device in an ordinary boiler as for dome or other uses.

The invention consists in the matters hereinafter described and more fully pointed out and defined in the appended claims.

In said drawings: Figure 1 is a fragmentary view partly in side elevation and partly in section of a water tube boiler to which a device embodying our invention is applied for cleaning the tubes. Fig. 2 is an enlarged side elevation of mechanism embodying our invention, showing the motor and holding device detached from the boiler. Fig. 3 is a top plan view thereof. Fig. 4 is an inner end elevation of the holding device showing the same engaged in a tube. Fig. 5 is a section on line 5—5 of Fig. 3. Fig. 6 is an enlarged section on line 6—6 of Fig. 5. Fig. 7 is an enlarged longitudinal section illustrating the locking mechanism in the female end of each shaft section and the bayonet male end of the next succeeding section interlocking therein. Fig. 8 is a similar section taken approximately at a right angle of that shown in Fig. 7. Fig. 9 is an enlarged section taken on line 9—9 of Fig. 5. Fig. 10 is an end elevation of the male member. Fig. 11 is a view similar to Fig. 2, but illustrating a slightly modified construction and showing the shaft as driven at a right angle with the drive illustrated in Fig. 2. Fig. 12 is a fragmentary top plan view of the locking means illustrated in Fig. 11. Fig. 13 is a view similar to Fig. 11, but illustrates the use of a flexible shaft for actuating the cleaners. Fig. 14 is an enlarged longitudinal section of the flexible shaft shown in Fig. 13. Fig. 15 is a section similar to Fig. 5, but illustrating a double locking mechanism. Fig. 16 is a section on line 16—16 of Fig. 15. Fig. 17 is a longitudinal section similar to Fig. 7. Fig. 18 is a longitudinal section taken approximately at right angles with Fig. 17. Fig. 19 is an end elevation of the male member.

As shown in the drawings: A rotary engine is employed for driving the flue-cleaner shafts, said engine being of the type set forth in the patent issued to William L. Casaday, on June 17th, 1902, No. 702,624, and consisting in the main of a cylinder A, in which is eccentrically journaled a rotative head A', having therein a transversely slidable abutment and plate which in the present construction is shown as consisting of two flat plates $a$—$a'$, fitted face to face and affording a central longitudinal recess between the same, in which is secured a spring $a^2$, which acts to press said plates inasmuch as the recess in each plate extends unequal distances from the ends of the plate, and said plates are faced together, as shown in Fig. 6, so that the longer unrecessed portion of one of said plates coincides with the shorter unrecessed portion of the other. Steam is admitted to the casing of the cylinder through a steam pipe B, and passes upwardly around the cylinder thus rotating the piston in the direction of the arrow shown in Fig. 6, and exhausting through the port $b$, into the casing B'.

Secured on the outer end of the shaft $a^4$, for the cylinder A', is a gear or pinion $a^5$ which meshes with a gear $a^6$, which is provided on its inner side with an elongated hub C, consisting, as shown, of four parts or arms $c$—$c'$—$c^2$—$c^3$, as shown in Figs. 5 and 9, which extend into the tube or cylindric casing B', to hold said gear $a^6$, in place and are provided each with outwardly directed right angled shoulders $c^4$, and outwardly from said shoulders are provided with inwardly inclined faces, as shown in Fig. 5. A gear case $a^7$, incloses said pinion and gear, and is constructed with an aperture therethrough registering with the central bore through said gear, which, as shown, is square to receive the square cutter shaft sections. As shown, a pipe $D^3$, is connected to discharge through a suitable port $d$, into said tubular shaft casing B', thereby condensing the steam by the water admitted therethrough, the resultant water flowing downwardly through the boiler tube to wash away the scale as the cutting progresses.

Rigidly secured in the end of the pipe casing B', in axial alinement therewith, as shown, is the attaching pipe D, adapted to extend into the boiler tube X, and to afford means for locking the mechanism in place thereon until the cleaning is completed. As shown, said attaching pipe D, is flanged at its end to permit the same to be rigidly bolted to, and in alinement with the pipe casing B', to communicate therewith, and as shown, said attaching pipe is provided at approximately equal distances apart with three spacing ribs $d$—$d'$—$d^2$, the first of which are integral with the pipe and are adapted to bear firmly against the inner side of the boiler tube being cleaned, and the other of which is longitudinally slotted to receive therein a slotted locking member D'. As shown, said longitudinally slotted rib $d^2$, is grooved longitudinally in its top to receive the locking bar D', therein, as shown in Figs. 2, 3, 4, and 5, and in said groove is provided upwardly and outwardly inclined cam faces $d^4$—$d^5$, complemental with corresponding cam faces $d^6$—$d^7$, on the locking bar D'. As shown also, an integral finger or detent $d^8$, is provided on said locking bar which extends laterally into a recess in the bottom of said groove and acts to confine the locking bar to said tube section, but permits the same to be moved longitudinally thereof, such movement tending to raise or lower the locking bar on said tube because of the mutual engagement of said cam faces. As shown, a spring E, comprising a rod or bar bent to afford one or more coils or loops is engaged at one end on said locking bar and at the other end to an eccentric $e'$, adapted to be operated by the hand lever $e^2$, and which, when swung in position, as shown in Figs. 2, 3, or 5, shifts the locking bar inwardly to permit release from the tube, but which, when swung halfway around or, in other words, in position for the detent $e^3$, on said lever to engage in the notch $e^4$, on the gear casing, holds said bar forwardly, thus throwing the outwardly directed teeth $d^9$, into engagement with the inner side of the flue, as shown in Fig. 4, thus firmly locking said tube from removal. Said spring, being at all times under tension, serves to hold said locking bar rigidly and wedgingly in adjustment.

To facilitate handling the cleaner shaft, short sections are used adapted to automatically interlock when inserted into the machine and which automatically detach one from the other, when the shaft is withdrawn. For this purpose, as shown, each shaft section may be made sufficiently short to enable one man to handle the same rapidly with ease, and to insert them in place, and for this purpose, of course, the length of shaft will vary with the use required, shorter sections being ordinarily required for interior work or dome work than in cleaning water tubes. Each of said sections consists of a square tube F, and as shown in Figs. 5 to 9 inclusive, the outer or female end of which contains a leaf spring $f$, riveted at its inner end in said tube and provided with a detent $f'$, secured near the free end of said leaf spring and projecting outwardly through the side of the shaft section in position to engage the shoulders $c^4$, in the hub of the gear $a^6$, as the sections are inserted into place, thereby holding the section from further inward movement until the end of the next section is inserted thereinto. The outer end of said leaf spring $f$, is provided with a slot or square aperture therethrough near the extremity, affording at the end a transverse bar or plate $f^2$. The forward end of each section is provided with a male member F', secured in the end of the shaft by means of a rivet $f^3$, said male member being of a size to fit in the female end of the shaft and having on its end or extremity a four sided bayonet catch $f^4$, any of the rearwardly shouldered prongs of which are adapted to engage in the aperture in said leaf spring to rigidly lock the sections together. As shown, however, the length of the male section is sufficiently greater than the distance from the outer extremity of the female end of the shaft to said aperture in said leaf spring, as to afford sufficient clearance for longitudinal movement between the ends of the shaft sections. In consequence, the male end of the shaft section may be pressed inwardly sufficiently to slide upwardly on the spring to detach the detent $f'$, from the shoulders $c^4$, in the hub of the gear, thus permitting the shaft to feed inwardly as the operator prepares to attach the next shaft section.

As shown in Figs. 15 to 18 inclusive a double female member or lock is provided which comprises an attaching block $f^5$, rigidly secured in the section F, having an outwardly extending lug $f^6$, on opposite faces of which are attached leaf springs $f^7$—$f^8$, normally inclined inwardly or toward each other. Secured to each leaf spring is a detent $f^9$, which projects through an aperture in the opposite leaf spring and through an aperture in the section F, to be engaged by the inclined faces $c^5$, to expand the springs when withdrawing the shafts to thereby release the head $f^{11}$, of the adjacent male member. In feeding the shaft inwardly the inclined faces of the male member $f^{11}$, force the leaf springs apart permitting the head to engage in oppositely disposed apertures in the ends of the leaf springs.

For dome and other interior work the exhaust may be directed laterally into an attaching pipe or casing $B^2$, which may be of short length and may also serve as the shaft casing. In this construction the bevel pinion $a^5$, meshes with a bevel gear $a^{10}$, the hub $a^{11}$, of which is journaled by means of ball or other anti-friction bearings in the outer end of the shaft casing. As shown also, said attaching tube or casing $B^2$, is adapted to fit in the end of the boiler tube and is likewise provided with an attaching bar $D^2$, substantially similar to the attaching bar D, before described, and which similarly engages in a longitudinally grooved rib $d^{10}$, on the top of said tube casing, and as shown, a lever $e^6$, is externally secured upon said casing to draw said attaching bar $D^2$, inwardly or outwardly and by swinging the same in either direction such adjustments may be effected to lock or to release the attaching tube in the boiler tube.

The construction shown in Fig. 13, is substantially identical so far as the motor is concerned, with that before described, but, as shown, a hose or tube G, is secured on the shaft casing or tube $B^3$, and through the same is fed the sectional shaft G', consisting of square tubular links $g$, and interfitting bar links $g'$, the ends of which are rounded or convex on all sides and extend into the ends of said tubular link and are pivotally engaged therein by means of rivets $g^2$, which extend through the links, the holes for which in the bar links are engaged in the ends to permit said links to rock in all directions, the rivets at opposite ends in the tubular links being engaged at right angles with each other.

The operation is as follows: The only platform necessary (in view of the small size and flexibility of the device and simplicity of attachment thereof in place) is that merely sufficient to elevate the operator to a height to conveniently handle the tool. Having inserted the attaching tube in the boiler tube, and swung the lever $e^2$, around into position for the detent $c^3$, to engage in the notch $e^4$, on the gear casing, the locking bar D', is drawn outwardly and up in the incline $d^4$—$d^5$, thus bringing the teeth $d^9$, therein firmly into engagement with the inner side of the boiler tube and firmly locking the motor and device as a whole in the boiler tube. In accomplishing this, the cutters or cleaners, (which may conveniently be of the type set forth in the patent issued to William L. Casaday, on the 20th day of November, 1906, No. 836,629,) are adjusted on the short square shaft F, so that the ends or points of the cleaners extend but a slight distance into the tubes. If steam is now turned into the engine or motor, the shaft section is rotated by the rotation of the gear $a^6$, the rate of rotation depending, of course, upon the resistance and pressure. As the shaft rotates the cleaning head cutting the scale from the tube draws the short shaft section inwardly this, of course, being assisted, if desired, by inward pressure by the operator on the end of the shaft, using for that purpose any rotatable or swiveled handle such, for instance, as the handle Y, shown in Fig. 13. As the shaft section feeds inwardly for nearly its entire length, the detent $f'$, engages first on the hub of the gear, if desired, or if not, on one of the outwardly facing shoulders $c^4$, on one of the arms of the hub, and the shaft is thereby held from further inward movement. When, however, the male end of the next succeeding shaft section is inserted into place, as shown in Figs. 7 and 8, the outer end of the leaf spring is depressed, retracting the detent $f'$, to permit the shaft to again slide forward through the angular aperture in the gear $a^6$, and in this manner the desired number of lengths or sections are added until the flue is entirely cleaned. The cleaning operation is greatly facilitated by the delivery of the exhaust steam into the shaft casing, as shown in Figs. 5 and 6, and at the same time delivering into said tube and through the water pipe a sufficient quantity of water to condense the exhaust steam and to wash out the scale as fast as cut loose from the tube. In this way the engine operates practically as a condensing engine, and a volume of water sufficiently to wash the flue is delivered continuously during the operation. When the flue is cleaned completely, the shaft sections may be readily withdrawn, inasmuch as the bayonet pointed end of one section remains engaged in the aperture in the spring of the other until the female end of the shaft sections appears through the gear case, at which time the centrally inclined faces on the outer side of said shoulders are engaged by said detent $f'$, or $f^9$, forcing the same downwardly sufficient for the spring $f$, or springs $f^7$—$f^8$ to release the end of the complemental section. In this manner it is obvious that the shaft sections automatically lock as the same are inserted into the machine and automatically unlock or freely separate one from the other as the sections are successively drawn from the machine. Having removed all the sections except the last with the cutter head thereon, the lever $e^2$, is swung around to releasing position, as shown in Figs. 2, 4 and 5, the locking bar $D'$, which slides back to its lowest position down the inclined collar faces, thus permitting the engine with all its attached parts to be removed from the tube just cleaned and inserted for engagement on the next, whereupon, of course, the operation is repeated and is continued from tube to tube until all are cleaned.

Of course, for work in domes where small space is afforded, it is often convenient to arrange the shaft drive at a right angle with the axis of rotation of the engine cylinder, as shown in Figs. 11 and 13. This enables the machine to be passed through any manhole aperture, and, owing to the short attaching pipe or tube used, enables the mechanism to be used in connection with exceedingly short tubes or openings corresponding short shaft sections, of course, being employed for such purposes.

We do not purpose limiting this application for patent otherwise than necessitated by the prior art, for obviously numerous details of construction and application may be varied without departing from the principles of this invention.

We claim as our invention:

1. A flue cleaner embracing a motor, a square sectional shaft driven thereby, a cleaner head on said shaft, said shaft comprising duplicate interchangeable sections each comprising a male and female end and co-acting locking means thereon adapted to automatically engage said shaft sections together as the same are inserted into a tube and to disengage the same automatically as withdrawn.

2. In a machine of the class described, shaft duplicate sections comprising interfitting male and female ends, complemental locking means thereon, adapted to automatically engage each other as the parts are brought together, and to release each other as the shaft sections are successively removed from the machine, a detent including a part of such mechanism, a member having an inclined face adapted to engage the same and press the same inwardly at the releasing point and a cleaner head on one of said sections.

3. A flue cleaner comprising a motor, means for supporting the motor, a square sectional shaft driven thereby and extending axially into said tube and having a cleaner head thereon, said shaft comprising duplicate interchangeable sections, co-acting locking means thereon adapted to automatically engage said shaft sections together as the same are inserted into the tube and to disengage the same automatically as withdrawn, and an inclined cam affording a part of the mechanism for effecting such disengagement.

4. In a machine of the class described, a shaft formed of duplicate sections, a cleaner head on said shaft, a locking spring secured in one end of each section provided with an inclined outer end which is apertured, a member secured in the opposite end of each shaft section having an inclined head to engage in the aperture in the spring to rigidly secure the sections together, a detent secured to each spring to lock each section from inward movement, said sections having relative longitudinal movement adapting the head of one section to engage on the inclined end of the spring to release the detent to permit advance movement of the shaft and a cam adapted to engage each detent as the shaft is withdrawn to release the head from the spring.

5. A flue cleaner comprising an engine, a square sectional shaft driven thereby and extending axially into a flue or tube, a cleaner head thereon, said shaft comprising duplicate interchangeable sections, coacting locking means thereon to automatically engage said shaft sections together as the same are inserted into the tube and to disengage the same automatically as withdrawn and means for holding each outer shaft section in locking position until another shaft section is inserted, said means automatically released by the insertion of each section.

6. A device of the class described comprising an engine, a tube adapted to extend into the boiler tube, an angular shaft inserted in said tube and rotated from the engine, said shaft comprising duplicate sections adapted to automatically interlock as the same are inserted successively into the machine and to automatically release as the same are withdrawn, detents in the outer ends of the sections adapted to limit the inward adjustment thereof until the next section is united therewith and acting also to detach the sections successively as the same are drawn outwardly, and a cleaner head on said shaft.

7. A flue cleaner embracing an engine, a tube extending into the boiler tube, means for securing the tube in the end of a boiler flue, an angular shaft inserted in said tube and rotated from the engine, and having a cleaner head secured thereon, said shaft comprising duplicate sections, means adapted to automatically lock the sections together as they are successively inserted into the attaching tube, and a detent at the outer end of each section adapted to limit the inward adjustment thereof until the next section is inserted in the attaching tube and acting also to automatically detach the sections successively as the same are drawn outwardly.

8. In a machine of the class described an attaching tube, embracing laterally directed ribs to engage in the boiler flue or tube, a locking bar having outwardly directed teeth thereon adapted to engage the tube, said locking bar having inclined faces thereon adapted to engage complemental faces on the attaching tube, a spring engaging said locking bar and an actuating lever engaged to said spring and acting to exert tension thereon to pull the bar outwardly and against the complemental faces, thereby wedgingly engaging the attaching tube in the boiler tube.

9. In a machine of the class described an attaching tube having ribs thereon adapted to fit in the boiler flue or tube, a locking bar slidably connected to one of said ribs and having outwardly directed teeth thereon adapted to engage the tube, said attaching tube and bar each having cam faces thereon, a spring connected to said locking bar and an actuating lever secured to said spring and acting to exert tension thereon to pull the bar outwardly and adapting the cams to force the locking bar and ribs to wedgingly engage the attaching tube in the boiler tube.

10. In a machine of the class described a sectional shaft comprising a male member secured to one end of each section, a cleaner head on said shaft, expansible spring members secured in the opposite end of each section adapted to engage the male member on opposite sides and means for rotating said shaft.

11. In a device of the class described a tubular support, a motor supported thereby, a sectional shaft adapted to be driven by said motor, a cleaner head on the shaft, a plurality of spring members in each section of the shaft and a head projecting from each section of the shaft adapted to automatically lock in the spring members when a head is inserted in the section.

12. In a device of the class described a tubular support, a motor supported thereby, a sectional shaft adapted to be driven by said motor, a cleaner head on the shaft, a plurality of spring members in each section of the shaft, a head projecting from each section of the shaft adapted to automatically lock in the spring members when the head is inserted in a section, a cam member secured at the outer end of the support and means secured to the springs adapted to be actuated by the cam to release the springs from the head of each section as the sections are withdrawn.

13. In a device of the class described a support, a motor, a sectional cleaner shaft, a cleaner head thereon, means for attaching a section to the part of the shaft previously inserted in the flue, and coöperating means within the support for automatically detaching the sections as the shaft is withdrawn from the flue.

14. A flue cleaning device having a tubular member, a motor supported thereby, a cleaner shaft driven by said motor, a cleaner head on said shaft, a locking bar slidable longitudinally in the tubular member adapted to jam the tubular member in the flue being cleaned to support the device, means for actuating the locking bar and a flexible connection between the same and locking bar.

15. In a device of the class described a tubular support, having cam faces thereon, a motor, a cleaner shaft adapted to be driven by said motor, a cleaner head thereon, and a toothed locking member provided with cams to engage the cams on the support to wedge the support in the tube being cleaned.

16. In a device of the class described a tubular support, having cam faces thereon, a motor, a cleaner shaft adapted to be driven by said motor, a cleaner head thereon, a toothed locking member provided with cams to engage the cams on the support to wedge the support in the tube being cleaned, guides for the locking member and means for holding the same in place on the support.

17. In a device of the class described a tubular support having one end shaped to extend into a flue, means adjustable on the support to wedge the end of the support in a flue, means secured on the support for actuating said means, and coacting stops for limiting the movement of the actuating means.

18. In a device of the class described a support, a motor carried thereby, a sectional shaft having a cleaner head thereon, springs secured in one end of each section provided with apertures, a member projecting from the opposite end of each section shaped to engage in the apertures in the springs of a complemental section, a member secured to each spring projecting through the side of each section, and a member provided with an inclined face adapted to engage the same and press the same inwardly to the releasing point.

In testimony whereof we have hereunto subscribed our names in the presence of two subscribing witnesses.

WILLIAM L. CASADAY.
J. OLIVER CASADAY.

Witnesses:
WM. E. KONZEN,
JOHN M. STAPLES.

Copies of this patent may be obtained for five cents each, by addressing the "Commissioner of Patents, Washington, D. C."